(12) United States Patent
Jaiswal et al.

(10) Patent No.: US 11,242,893 B2
(45) Date of Patent: Feb. 8, 2022

(54) COMPOSITION OF HIGH PERFORMANCE BEARING OIL FOR STEEL PLANTS

(71) Applicant: INDIAN OIL CORPORATION LIMITED, Mumbai (IN)

(72) Inventors: Anil Kumar Jaiswal, Faridabad (IN); Kannan Sethuraman, Faridabad (IN); Sumit Bhaskaran, Faridabad (IN); Rameshwar Chaudhary, Faridabad (IN); Rajendra Mahapatra, Faridabad (IN); Ajay Kumar Harinarain, Faridabad (IN); Deepak Saxena, Faridabad (IN); Sanjiv Kumar Mazumdar, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 0 days.

(21) Appl. No.: 16/294,750

(22) Filed: Mar. 6, 2019

(65) Prior Publication Data

US 2019/0277339 A1 Sep. 12, 2019

(30) Foreign Application Priority Data

Mar. 6, 2018 (IN) .............................. 201821008250

(51) Int. Cl.
| | |
|---|---|
| C10M 169/04 | (2006.01) |
| F16C 33/66 | (2006.01) |
| C10M 129/10 | (2006.01) |
| C10M 133/04 | (2006.01) |
| C10M 135/20 | (2006.01) |
| C10M 137/04 | (2006.01) |
| C10M 135/10 | (2006.01) |
| C10N 30/02 | (2006.01) |
| C10N 30/06 | (2006.01) |
| C10N 30/10 | (2006.01) |
| C10N 30/12 | (2006.01) |
| C10N 30/14 | (2006.01) |

(Continued)

(52) U.S. Cl.
CPC ....... *F16C 33/6688* (2013.01); *C10M 129/10* (2013.01); *C10M 133/04* (2013.01); *C10M 135/20* (2013.01); *C10M 137/04* (2013.01); *C10M 169/044* (2013.01); *C10M 169/048* (2013.01); C10M 135/10 (2013.01); C10M 2203/1006 (2013.01); C10M 2203/1025 (2013.01); C10M 2205/02 (2013.01); C10M 2205/0285 (2013.01); C10M 2207/023 (2013.01); C10M 2207/026 (2013.01); C10M 2207/027 (2013.01); C10M 2207/046 (2013.01); C10M 2207/121 (2013.01); C10M 2207/128 (2013.01); C10M 2207/281 (2013.01); *C10M 2207/282* (2013.01); *C10M 2207/2805* (2013.01); C10M 2209/084 (2013.01); C10M 2215/04 (2013.01); C10M 2215/064 (2013.01); C10M 2215/065 (2013.01); C10M 2215/223 (2013.01); C10M 2217/024 (2013.01); C10M 2219/044 (2013.01); C10M 2219/046 (2013.01); C10M 2219/106 (2013.01); C10M 2223/04 (2013.01); C10M 2223/041 (2013.01); C10M 2223/043 (2013.01); C10M 2223/047 (2013.01); C10M 2223/049 (2013.01); C10M 2227/06 (2013.01); C10M 2229/02 (2013.01); C10M 2229/041 (2013.01); C10N 2030/02 (2013.01); C10N 2030/06 (2013.01); C10N 2030/10 (2013.01); C10N 2030/12 (2013.01); C10N 2030/14 (2013.01); C10N 2030/24 (2020.05); C10N 2030/40 (2020.05); C10N 2040/02 (2013.01)

(58) Field of Classification Search
CPC ........... F16C 33/6688; C10M 169/044; C10M 169/048; C10M 137/04; C10M 135/20; C10M 133/04; C10M 129/10; C10M 2215/223; C10M 2207/026; C10M 2223/047; C10M 2219/106; C10M 2207/027; C10M 2207/282; C10M 2207/2805; C10M 2203/1025; C10M 2215/064; C10M 2209/084; C10M 2223/041; C10M 2219/046; C10M 2205/02; C10M 2207/023; C10M 2203/1006; C10M 2207/046; C10M 2207/121; C10M 2219/044; C10M 2207/281; C10M 2229/041; C10M 2207/128; C10M 2223/043; C10M 2227/06; C10M 2229/02; C10M 2215/065; C10M 2205/0285; C10M 2215/04; C10M 2217/024; C10M 2223/049; C10M 2223/04; C10M 135/10; C10N 2230/24; C10N 2230/10; C10N 2230/06; C10N 2230/40; C10N 2230/02; C10N 2240/02; C10N 2230/12; C10N 2230/14

See application file for complete search history.

(56) References Cited

U.S. PATENT DOCUMENTS

2010/0041572 A1* 2/2010 Sano .................. C10M 101/025
508/382

FOREIGN PATENT DOCUMENTS

| CN | 1259561 A * | 7/2000 | |
| CN | 1259561 A | 7/2000 | |

(Continued)

*Primary Examiner* — Taiwo Oladapo
(74) *Attorney, Agent, or Firm* — Maschoff Brennan

(57) ABSTRACT

The present invention relates to a Zinc free High Performance bearing oil composition for Lubrication of Bearings, Gears & Allied Equipments in Wire Rod Mill (WRM) for Steel Plants.

3 Claims, No Drawings

(51) Int. Cl.
*C10N 30/00* (2006.01)
*C10N 40/02* (2006.01)

(56) References Cited

FOREIGN PATENT DOCUMENTS

| | | | |
|---|---|---|---|
| CN | 1346874 | A | 5/2002 |
| CN | 102719305 | A | 10/2012 |
| CN | 102766505 | A | 11/2012 |
| CN | 102260577 | B | 5/2013 |
| CN | 104342260 | A | 2/2015 |

\* cited by examiner

COMPOSITION OF HIGH PERFORMANCE BEARING OIL FOR STEEL PLANTS

RELATED APPLICATION

This application is a continuation of Indian Patent Application No. 2018-21008250, filed Mar. 6, 2018, which is incorporated by reference in its entirety.

FIELD OF THE INVENTION

The present invention describes a novel composition of Zinc free high performance bearing oil composition for heavy duty applications of no-twist wire rod mills (WRM) in steel plants.

BACKGROUND OF THE INVENTION

The Morgoil bearing has been the leading oil film bearing globally manufactured by Siemens Vai (formerly Morgan Construction Company), Danieli, SMS Demag, etc., employed in Wire Rod Mills (WRM) for the metal industry. Since the 1930's, the tapered roll neck Morgoil bearing has been the premier load carrying bearings used in the steel plants. In general, bearing oil supplies the adequate amount of oil at the operating temperatures to oil film bearing which allows the bearings to operate at peak capacity during extended heavy duty operations. The primary task of lubricating oil is to separate the sliding surfaces to provide smooth & reliable operation. The oil also acts as heat transfer medium, protects machine components against wear, rust, corrosion, separation of water, air and dust particles and resistance against oxidation, etc.

With the development of metallurgical industry, the rapid development to high speed steel plate and bar rolling mill has led to the introduction of high speed wire rod mills around the globe. High speed wire rod mills mechanical transmission is complex with high precision and with the introduction of new generation high speed wire rod mills which is running up-to 120 m/s making the oil film bearing with high torque loads. Therefore, the need for special lubricants for lubrication includes transmission on extreme-pressure, oxidation stability, etc. In addition, continuous injection of cooling water that requires higher pressure during rolling, which in turn makes oil film bearing oil highly susceptible to emulsification. Therefore, the bearing oil is required to have excellent anti-emulsion, anti-rust and anti-corrosion properties. In order to protect the oil film bearing under long service life, the third generation oil film bearing oil has been developed around the world. The first generation is an antioxidant free oil film bearing oil; the second generation is an anti-rust, antioxidant oil film bearing oil, the third generation belongs to the heavy duty oil film bearing oil which is an antioxidant, anti-rust and anti-wear type for steel industry.

Heavy duty circulating oil of ISO VG 100 grade specifically designed to meet the lubrication requirements of bearings and gears in high speed No Twist Wire Rod Mills manufactured by the steel plant OEMs. Such type of oil is supposed to have superior abrasion resistance, anti-wear/extreme pressure, oxidation stability, anti-rust, anti-corrosive and filterability properties in addition to high water separation capabilities. Because of these special requirements of abrasion resistant film bearing oil, indigenous development of oil is more intricate to break through the technical impasse as the present domain has long been hogged by foreign companies. Moreover, there is a scarcity of relevant published literature for development of abrasive resistant film bearing oil.

In the recent years, the metallurgical industry has been greatly impacted by the market, the whole industry is carrying out income increasing and cost saving activities. Therefore, it would be of great economic and social benefit to develop oil film bearing oil for domestic high speed wire rod mills with high quality and cost economical price.

PRIOR ART

CN 104342260 A relates to the use of a lubricating oil composition. The composition comprises the following components in parts by weight: a) 1-10 parts of detergent, b) from 1 to 15 parts of a dispersant; c) from 1 to 10 parts of an antioxidant; d) from 0.03 to 2.0 parts by weight of an pour-point depressant; e) 0.01-2 parts of rust inhibitor, f) 0.05-10 parts of viscosity index improver and g) 50-90 parts of base oil. In the composition, the calcium content is not less than 2500 ppm, the zinc content is not less than 900 ppm, and the phosphorus content is not less than 800 ppm; and thus, the composition can satisfy the SHRHYXY15259-2013 quality grade requirements and is used for lubrication and rust prevention of micromotor oil-retaining bearings.

CN 102766505 A discloses an ashless antiwear oil film bearing lubricant composition, which comprises: (A) at least a highly refined mineral oil with high viscosity index; (B) at least an emulsifier; (C) at least an anti-foaming agent; (D) at least an ashless phosphorus-containing antiwear additive; (E) at least an anti-oxidant; and (F) at least a metal passivator. The above lubricant component has excellent demulsibility, filterability, anti-foaming property, air release property, abrasion resistance and oxidation resistance, passes through FAG FE-8 bearing wear experiments, SKFEMCOR bearing corrosion experiments and FLENDER anti-foaming experiments, and is suitable for lubricating various bearings and industrial gears, especially lubricating high speed wire rod oil film bearings.

CN 102719305 A discloses totally synthetic non-staining bearing oil. The bearing oil comprises, by weight, 41-90% of synthetic lubricating oil, 2-20% of synthetic ester, 0.1-10% of an extreme pressure anti-wear additive, 0.1-10% of a purification dispersant, 0.1-10% of an antirust corrosion-resistant additive, 0.1-5% of an antioxidant, 0.01-0.1% of a demulsifying agent, 0.1-3% of a viscosity index improver and 0.01-1% of an antifoaming agent. The totally synthetic non-staining bearing oil has the advantages of being high in operating viscosity index, superior in lubricating property, high in high-temperature oxidation stability, wide in operating temperature range, superior in annealing detergence, particularly suitable for protection of lubricating, cooling, rust prevention and oil seal for bearing systems of steel rolling mills and non-ferrous metal rolling mills, and the like; and problems of insufficient lubricating property, poor oxidation stability, particularly poor surface quality of rolled work pieces due to oil dirt and stains during rolling processes in a mechanical drive process can be effectively solved, and the processing efficiency, the processing quality and the service life of devices can be greatly improved.

CN1346874A discloses a heavy-duty anti-emulsifying oil film type bearing oil for high-speed wire rolling mill contains demulsifier, anti-wear agent, antifoaming agent, alkylnaphthalene, antioxidant and mineral oil. Its advantages are excellent antiemulsifying, antiwear, anti-extreme-pressure, anticorrosion, antirust, antifoaming and antioxidizing performance, and better viscosity-temp characteristic.

CN 102260577 B discloses no oil film bearing oil additive composition. The PIBA detergent additives in lubricating oils instead of the traditional use of polyisobutylene succinimide and alkaline calcium sulfonate, magnesium detergent dispersant, can significantly improve non-oil film bearing oil water separation properties (also known as broken milk performance), but without any negative effect on the thermal stability and compatibility of the base oil, thermal oxidation stability, rust resistance and abrasion resistance. Meanwhile, add the polyol ester oil agent, not only enhance the abrasion resistance, colleagues, but also help further improve watershed properties.

CN 1259561 A discloses oil film bearing oil composition which includes (A) definite quantity of base oil; (B) at least one extreme pressure anti-scuff agent; (C) at least one antioxidant and/or antioxygenation and corrosion-resisting agent, and/or metal passivating agent; (D) at least one antirusting agent; (E) definite quantity of anti emulsifying agent; (F) antifoaming agent; (G) proper amount of pour point reducer; (H) proper amount of viscosity modifier and (I) proper amount of antiemulsify anti wear fortifier.

Genesis of Development of High Performance Bearing Oil for No-Twist Wire Rod Mill:

Heavy duty oil film bearing oil is specifically designed to meet the requirements of high speed No Twist Wire Rod Mills manufactured majorly by Morgan Construction Company, Danieli, SMS Demag, etc. must have the following important characteristics;

Excellent antiwear property to perform under high speed and high load.
Superb rust inhibition property since the entire operation is performed under the moist conditions.
Superior demulsibility to separate water and provide lubrication to the bearings and gears.

Advantages:

The above discussed prior arts have the following limitations and the present invention overcomes the aforesaid limitations:

Novel composition is based on zinc free chemistry based ashless antiwear, extreme pressure, Forschungsstelle fur Zahnrader and Getreibebau (FZG) booster additives includes mixture of antioxidants, metal deactivator, pour point depressant, de-foament and combination of metal sulphonates as rust & corrosion inhibitor in mixture of new quality mineral base oils.
Oxidation life as seen in RPVOT test is more than three to four times in comparison to industry accepted Multi National Company (MNC) product.
Composition meets UEC (USX Engineers and Consultants, Inc., USA) dynamic demulsibility endurance (DDE) characteristics to ascertain long term demulsibility performance.
Composition exhibited super demulsifying property during extended usage.
Composition possesses more than double load bearing capability as seen in step-up gradually increasing load in Schwingung Reibung Verschlez (SRV) test ring over MNC product.
Composition exhibited lower traction coefficient (~30-40%) over MNC product in pure rolling @ 0% SRR (sliding rolling ratio) in MTM test.
Composition exhibited lower traction coefficient (~4-7%) over MNC product in high speed with sliding @ 40% SRR in MTM test at different load & temperature.
Composition provided lower amount of wear metal build-up during actual operation in presence of water.
Excellent demulsibility property during extended operation.
Superb oxidative life as seen in RPVOT for fresh as well as aged oil samples.
Superior antiwear performance as seen in Mini Traction Machine (MTM) as well as in wear metal build-up analysis from aged oils over MNC product.
Stabilized bearing temperature in all cassettes during operation.
No bearing failure observed during field validation.
Longer drain period based on field samples analysis results.

SUMMARY OF THE INVENTION

Accordingly, present invention provides a zinc free bearing oil composition comprising:
(a) 0.05 to 2.0 weight % of ashless antiwear or extreme pressure agent as additive 1;
(b) 0.01 to 1.0 weight % of antiwear, extreme pressure or FZG booster as additive 2;
(c) 0.01 to 1.0 weight % of phenolic oxidation inhibitor as additive 3;
(d) 0.01 to 1.0 weight % of aminic oxidation inhibitor as additive 4;
(e) 0.01 to 0.60 weight % of rust or corrosion inhibitor I having sulphonate as additive 5;
(f) 0.01 to 1.2 weight % of rust or corrosion inhibitor II having amine derivative or succinic acid ester or boron derivative as additive 6;
(g) 0.001 to 0.50 weight % of metal passivator as additive 7;
(h) 0.001 to 1.0 weight % of pour point depressant as additive 8;
(i) 0.001 to 0.25 weight % of defoament as additive 9;
(j) optionally, 0.001 to 0.05 weight % of demulsifier as additive 10; and
(k) 90% wt. to 99.9 weight % of a base,
wherein the weight % being based on the total weight of the composition.

In one of the feature of the present invention, the additive 1 is selected from sulphur and phosphorus based ashless antiwear or extreme pressure agent and combination thereof; wherein:
(i) the sulphur and phosphorus antiwear or extreme pressure ashless agent is based on alkyl triphenyl phosphorothionate chemistry containing sulphur and phosphorus in the ratio of 1:1 and the alkyl chain length is C2-C8; and
(ii) the phosphorus antiwear or extreme pressure ashless agent is selected from di-n-octyl-phosphite, tris-nonylphenyl phosphate, i-decyl-diphenyl phosphate and mixture thereof.

In another feature of the present invention, the additive 2 is selected from:
(i) zinc free system which is sulphur and phosphorus chemistry based antiwear or extreme pressure or FZG booster comprising of dialkyl dithiophosphate chemistry containing sulphur and phosphorus in the ratio of 2:1; and
(ii) the antiwear or extreme pressure or FZG booster is mixture of amine phosphate wherein phosphorus and nitrogen are in the ratio of 2:1.

In yet another feature of the present invention, the additive 3 is the phenolic oxidation inhibitor selected from mixture of alkylated phenolic antioxidant having alkyl chain length of C2 to C12, sterically hindered phenol, benzenepropionic acid, 3-5-bis(1-1-dimethylethyl)-4-hydroxy alkyl ester, salt of 4-nonylphenoxy compound and mixture thereof.

In still another feature of the present invention, the additive 4 is the aminic oxidation inhibitor selected from diaryl amine, alkylated diaryl amine and mixture thereof wherein:
(i) the diaryl amine is selected from phenyl alpha naphthyl amine (PANA),
(ii) the alkylated diaryl amine is selected from alkylated diphenyl amine, and alkylated phenyl naphthyl amine, wherein:
the alkylated diphenylamine is selected from di-nonylated diphenyl amine, nonyl diphenyl amine, octyl diphenyl amine, di-octylated diphenyl amine, decyl diphenylamine and mixture thereof; and
the alkylated phenyl naphthyl amine is selected from butyl phenyl naphthyl amine, octyl phenyl naphthyl amine, di-octyl phenyl naphthyl amine, nonyl phenyl naphthyl amine, di-nonyl phenyl naphthyl amine, di-decyl phenyl naphthyl amine and mixture thereof.

In yet another feature of the present invention, the additive 5 is selected from alkali metal sulphonate, alkaline earth metal sulphonate, alkali metal phenate, alkaline earth metal phenate, succinic acid ester, amine phosphate and mixture thereof.

In yet another feature of the present invention, the alkali metal sulphonate, or alkaline earth metal sulphonate is neutral salt or an over based salt or mixture thereof, and the over based salt is overbased sulphonate having total base number of 180 to 450 TBN.

In still another feature of the present invention, the additive 6 is selected from amine phosphate derivative, succinic acid ester, alkyl sarkosinate, iso-nonyl phenoxy acetic acid, and boron derivative.

In yet another feature of the present invention, the additive 7 is selected from benzotriazole derivative, tolutriazole derivative, and thiadiazole derivative.

In yet another feature of the present invention, the additive 8 is selected from poly methacrylate, polyacrylamide, alkyl methacrylate derivative, poly alkyl methacrylate derivative, olefin copolymer, derivate of olefin co-polymer and derivate of polyalkylene.

In still another feature of the present invention, the additive 9 is selected from organic polyacrylate polymer, commercially available ash containing defoamer, ashless alkyl acrylic, silicone, poly siloxane, poly dimethyl siloxane and mixture thereof.

In still another feature of the present invention, the additive 10 is selected from condensed polymeric alcohol, ester of fatty acid, fatty alcohol alkoxylated with alkylene oxide and mixture thereof.

In yet another feature of the present invention, the base oil is selected from base oil of API Group I, Group II, Group III, Group IV, Group V and mixture thereof.

Present invention also provides a process for preparing zinc free bearing oil composition, wherein the process comprises mixing the additives in the amount as mentioned above in the base oil at a temperature in the range of 60° C. to 65° C.

OBJECTIVES OF EMBODIMENTS OF THE INVENTION

It is an objective of embodiments of the present invention is to provide Novel Composition of High Performance Bearing Oil for Steel Plants.

It is a further objective of embodiments of the present invention is to provide novel composition of Zinc free high performance bearing oil.

It is a further objective of embodiments of the present invention is to provide a composition useful for heavy duty applications of no-twist wire rod mills (WRM) in steel plants.

DETAILED DESCRIPTION OF THE INVENTION

Accordingly the present invention provides a Novel composition comprises combination of following performance additives and the invented composition possesses;
a) Additive 1:
According to the preferred features of the present invention, additive 1 is based on sulphur and phosphorus antiwear/extreme pressure ashless agent based on alkyl triphenyl phosphorothionate chemistry containing sulphur and phosphorus in the ratio of 1:1 and the alkyl chain length is $C_2$-$C_8$. More preferably the alkyl chain length is $C_4$-$C_6$.
In detailed feature of the present invention, antiwear/extreme pressure additives, not limiting to ashless sulphur and phosphorus chemistry, the ashless antiwear/extreme pressure additive is based on phosphorus chemistry and further in the detailed embodiments it is di-n-octyl-phosphite, tris-nonylphenyl phosphate, i-decyl-diphenyl phosphate or mixture of thereof.
This ashless antiwear/extreme pressure agent is present in the range of 0.05 to 2.0 percent by weight of the composition.
b) Additive 2:
According to the preferred feature of the present invention, additive 2 is based on zinc free system and it is sulphur and phosphorus chemistry based antiwear/extreme pressure/FZG booster additive system comprising of dialkyl dithiophosphate chemistry containing sulphur and phosphorus preferably in the ratio of 2:1.
In detailed feature of the present invention, antiwear/extreme pressure additives/FZG booster, not limiting to ashless sulphur and phosphorus chemistry, the antiwear/extreme pressure/FZG booster additive is mixture of amine phosphate wherein phosphorus and nitrogen are in the ratio of 2:1.
The antiwear, extreme pressure, FZG booster containing additive system is present in the range of 0.01 to 1.0 percent by weight of the composition.
c) Additive 3:
According to preferred feature of the present invention, additive 3 is the phenolic oxidation inhibitor comprising of mixtures of alkylated phenolic antioxidant having alkyl chain length of $C_2$ to $C_{12}$. Preferably the alkyl chain length is $C_4$ to $C_8$. In the present invention, this is of sterically hindered phenol, benzenepropionic acid, 3-5-bis(1-1-dimethylethyl)-4-hydroxy alkyl ester, salt of 4-nonylphenoxy compounds or mixture thereof. The alkyl chain length is of $C_4$ to $C_{10}$. Preferably the alkyl chain length is $C_7$-$C_9$.
According to preferred feature of the present invention, one of the oxidation inhibitor is present in the range of 0.01 to 1.0 percent by weight of the composition.

d) Additive 4:
   According to preferred feature of the present invention, additive 4 is the aminic oxidation inhibitor comprising of alkylated diphenyl amine antioxidant having alkyl chain length of $C_2$ to $C_{10}$. Preferably the alkyl chain length is $C_4$ to $C_8$. The diaryl amine or alkylated diaryl amine is phenyl alpha naphthyl amine (PANA), an alkylated diphenyl amine, or an alkylated phenyl naphthyl amine, or mixture thereof. The alkylated diphenylamine includes di-nonylated diphenyl amine, nonyl diphenyl amine, octyl diphenyl amine, di-octylated diphenyl amine, decyl diphenylamine and mixture thereof. In one embodiment, the alkylated diphenyl amine includes nonyl diphenyl amine or di-nonyl diphenyl amine. The alkylated diaryl amine includes butyl, octyl, di-octyl, nonyl, di-nonyl or di-decyl phenyl naphthyl amines.
   According to preferred feature of the present invention, one of the aminic oxidation inhibitor is present in the range of 0.01 to 1.0 percent by weight of the composition.

e) Additive 5:
   In detailed feature of the present invention, the Rust/Corrosion inhibitor comprises of, not limiting to, metal containing neutral sulphonate or high TBN (total base number) sulphonate, succinic acid ester, amine phosphate or mixture thereof.
   According to preferred feature of the present invention, additive 5 is the rust/corrosion inhibitor alkali metal or alkaline earth metal containing phenates and/or sulphonates. The alkali metal or alkaline earth metal sulphonates are alkaline earth metal salts preferably the sodium, magnesium or calcium salt or more preferably the calcium salt of an alkyl aromatic sulphonic acid. The alkyl aromatic sulphonic acid is petroleum sulphonic acids or synthetic sulphonic acids available commercially. The alkali metal or alkaline earth metal phenates are the alkali metal salts preferably the sodium, magnesium or calcium salt or more preferably the calcium salts of alkylphenols, alkyl phenolsulfides. The metal containing sulphonates is neutral salt or an over based salt or mixture thereof. The overbased sulphonate in the present invention have total base no. of 180 to 450 TBN. The over based sulphonate present in this invention preferably of 300 TBN. According to the present invention, metal containing sulphonates is in the range of 0.01 to 0.60 percent by weight of the composition.

f) Additive 6:
   According to preferred feature of the present invention, additive 6 is the amine phosphate derivative or succinic acid ester, alkyl sarkosinate, iso-nonyl phenoxy acetic acid, or boron derivatives. The amine phosphate derivate is mixture of amine phosphate derivative with multifunctional property and phosphorus and nitrogen is in the ratio of 2:1. The succinic acid ester is having total acid no. of 160-185 mg KOH/gm. The alkyl sarkosinate is n-cis-9-octadecanoyl sarcosine, n-cis-decenoylsarcosine, n-oleoyl sarcosinate, n-oleyl sarcosine or oleyl sarcosine and the alkyl sarkosinate having alkyl chain length of $C_{10}$-$C_{21}$ and more preferably to $C_{17}$-$C_{20}$. In the detailed embodiment, rust and corrosion inhibitors is in the range of 0.01 to 1.2 percent by weight of the composition.

g) Additive 7:
   The metal passivator is derivatives of benzotriazole or tolutriazole or derivatives of thiadiazole. According to the preferred embodiment metal passivator is the mixture of derivatives of benzotriazole or tolutriazole or derivatives of thiadiazole. The preferred range is from 0.001 to 0.50 percent by weight of the composition.

h) Additive 8:
   According to preferred feature of the present invention, the composition further comprises a pour point depressant, wherein, the pour point depressant is selected from a group comprising poly methacrylates, polyacrylamides, alkyl or poly alkyl methacrylate derivative or olefin copolymer, derivates of olefin co-polymer or derivatives of polyalkylene. The preferred range is from 0.001 to 1.0 percent by weight of the composition.

i) Additive 9:
   In detailed feature of the present invention, the defoamer is selected from a group comprising of organic polyacrylate polymer or commercially available ash containing defoamer. The anti-foam agent comprises of, not limiting to, ashless alkyl acrylic, silicone, poly siloxane, poly dimethyl siloxane or mixture thereof as anti-foam agent and it is in the range of 0.001 to 0.25 percent weight of the composition.

j) Additive 10:
   The demulsifier is selected from a group comprising of condensed polymeric alcohols, esters of fatty acids, fatty alcohols alkoxylated with alkylene oxides, and mixtures thereof. The novel composition of high performance bearing oil optionally contains demulsifier in a sufficient amount to provide excellent demulsifying property. The demulsifiers are selected from the group comprising of condensed polymeric alcohols, esters of fatty acids, fatty alcohols alkoxylated with alkylene oxides, or mixtures thereof. The preferred range in the bearing oil composition is from 0.001 to 0.05 percent by weight.

k) Base oils—New quality base oils of API Group I/II/III/IV/V & its mixture thereof
   According to preferred feature of the present invention, the mixture of severely refined base stocks, or hydrotreated/hydro-processed/iso-dewaxed base stocks, or hydrotreated/hydro-processed/iso-dewaxed base stocks and alkylated naphthalene, or mixture of synthetic bases and ester or mixture of synthetic bases and alkylated naphthalene or alkylated naphthalene bases or mixtures thereof is selected from combination of premium quality base oils of API Group II, Group III and base oils of Group IV, Group V class.
   In detailed embodiment, the Base oils comprises of, not limiting to, combination of new quality base oils of API Group I/II/III/IV/V & its mixture thereof and it is in the range of 90% wt. to 99.9% wt.

The composition of novel high performance bearing oil includes combination of premium quality base oils of API Group I, Group II, Group III and base oils of Group IV, Group V class, as defined in the API interchangeability guidelines, or mixtures thereof. These base oils are commercially available in the market.

According to another preferred feature of the present invention, the composition is used for enhancing water shedding property of bearing oil for heavy duty applications of no-twist wire rod mills (WRM) in steel plants.

In one of the preferred feature, the present invention provides a novel bearing oil additive composition comprising:
   (a) sulphur, phosphorus based anti-wear, extreme pressure and FZG booster containing additives; and
   (b) mixture of phenolic and aminic antioxidants; and
   (c) metal containing rust & corrosion inhibitors; and
   (d) metal passivator, and
   (e) a pour point depressant, demulsifier and antifoam agents.

The present invention also provides a process for preparing high performance bearing oil additive composition by mixing the appropriate amount of chosen additives or additive systems in a beaker/container. The additives combinations are further optimized in combination of selected hydrocarbon base oils to achieve desired performance in the laboratory tests. The chosen additives are mixed in selected base oils for preparing the candidates at an appropriate temperature such as an average blending temperature of 60° C. to 65° C., so that mixture gets bright, clear and homogeneous.

The referred formulae are suitable to use as bearing oil of different ISO viscosity grades. The viscosity grade is of ISO VG 100 to ISO VG 680 as recommended by the OEMs for no-twist wire rod mills. The composition is used in various wire rod mill applications in metal industry. Various physico-chemical & tribological performance tests were conducted to assess the performance in laboratory and thereafter field validation was done on promising candidate in a steel plant.

EXAMPLES

The examples (1 to 24) are listed in Table-1, Table-2 and Table-3 and these examples were prepared by mixing the components in percentage by weight.

The base oils used in the examples are of API Group I, Group II, Group III, Group IV & Group V types or mixture thereof. These base oils are commercially available in the market.

The array of commercially available additives and additive systems were selected in various combinations to achieve best performance. The additives includes antiwear/extreme pressure & FZG booster agents, rust & corrosion inhibitors, antioxidants, metal deactivator, pour point depressant, demulsifier, defoament, etc.

The candidate blends were prepared and tested for various physico-chemical tests including performance properties such as kinematic viscosity, pour point, flash point, foam, copper strip corrosion, rust test, demulsibility as per ASTM D 1401 and ASTM D 2711 (modified) and tribological tests as per OEM designed industry antiwear type bearing oil standard. ASTM D 2711 (modified) test has been carried out at test temperature of 52° C. instead of 82° C. specified in the standard.

In general, an antiwear bearing oil (ISO VG 100) is recommended for lubrication of bearings & gears in cassettes and wire rod block however higher viscosity grade (ISO VG 150 or higher) is recommended in roughing or pre-finishing strand in no-twist wire rod mill or bar mill in steel plants. The kinematic viscosity was tested as per ASTM D 445. The viscosity index of the composition found to be >95 as per ASTM D 2270. The pour point of the compositions were measured by ASTM D 97 and was found to be above (−) 15° C. which provides the low temperature performance of the composition when the oil is used at conditions where the ambient is low. The water separability behavior or demulsibility test was carried out as per ASTM D 1401 and was found to vary for various compositions from a time period of 10 minutes to 25 minutes with different amount of oil, water and emulsion separation. The excellent water separating characteristics of the composition even in the absence of a suitable demulsifier makes it a promising candidate for the heavy duty bearing oil lubrication. The inferior water separation property of the bearing oil composition can cause various issues in field such as rusting, leaching of additive system, sludge generation, clogging of the filters used in operation, inferior film formation on critical equipment parts and thereby leading to insufficient performance of oil lubrication. The water separation characteristics as determined by modified ASTM D 2711 where the turbulence caused during pumping and circulation of the lubricating oil in the wire rod block system which can cause emulsion forming tendency therefore bearing oil must possess excellent water shedding property during extended operation. The compositions showed poor, moderate and excellent demulsibility characteristics. The compositions were tested for air release value as per ASTM D 3427, resistance towards copper corrosion was studied by ASTM D 130 and rust prevention characteristics of the composition were studied by ASTM D 665. The oxidative life of the composition found to be more than three times to industry accepted product when studied by rotating pressure vessel test (RPVOT) as per ASTM D 2272 establishing superb oxidation stability.

TABLE 1

| | Example 1 to Example 9 | | | | | | | | |
|---|---|---|---|---|---|---|---|---|---|
| Components | Example 1 | Example 2 | Example 3 | Example 4 | Example 5 | Example 6 | Example 7 | Example 8 | Example 9 |
| API Group I | 22.000 | — | — | 22.000 | 96.390 | 96.390 | 24.000 | 27.000 | 24.000 |
| API Group II | 77.679 | 91.877 | — | 76.570 | — | — | — | 71.770 | 72.610 |
| API Group III | — | — | — | — | — | — | 72.310 | — | — |
| API Group IV | — | 5.000 | 76.450 | — | — | — | 3.000 | — | 3.000 |
| API Group V | — | — | 22.000 | — | — | — | — | — | — |
| Additive 1 | 0.050 | 1.450 | 0.900 | 0.550 | 0.300 | 0.300 | 0.400 | 0.500 | — |
| Additive 2 | — | 0.050 | — | 0.040 | 0.100 | 0.100 | — | 0.040 | — |

TABLE 1-continued

Example 1 to Example 9

| Components | Example 1 | Example 2 | Example 3 | Example 4 | Example 5 | Example 6 | Example 7 | Example 8 | Example 9 |
|---|---|---|---|---|---|---|---|---|---|
| Additive 3 | 0.010 | 0.500 | 0.500 | 0.150 | 0.450 | — | — | 0.150 | — |
| Additive 4 | 0.100 | 0.500 | 0.100 | 0.300 | — | 0.450 | 0.200 | 0.150 | 0.200 |
| Additive 5 | — | 0.600 | 0.010 | 0.300 | — | — | — | 0.300 | — |
| Additive 6 | 0.100 | — | — | — | 1.200 | 1.200 | — | — | 0.100 |
| Additive 7 | 0.030 | 0.001 | 0.010 | 0.050 | 0.300 | 0.300 | 0.050 | 0.050 | 0.050 |
| Additive 8 | 0.001 | 0.020 | 0.010 | 0.020 | 1.000 | 1.000 | 0.020 | 0.020 | 0.020 |
| Additive 9 | 0.010 | 0.001 | 0.020 | 0.020 | 0.250 | 0.250 | 0.020 | 0.020 | 0.020 |
| Additive 10 | 0.020 | 0.001 | — | — | 0.010 | 0.010 | — | — | — |
| Total (% wt.) | 100.000 | 100.000 | 100.000 | 100.000 | 100.000 | 100.000 | 100.000 | 100.000 | 100.000 |

TABLE 2

Example 10 to Example 17

| Components | Example 10 | Example 11 | Example 12 | Example 13 | Example 14 | Example 15 | Example 16 | Example 17 |
|---|---|---|---|---|---|---|---|---|
| API Group I | 22.000 | 22.000 | 22.000 | 22.000 | — | 22.000 | 22.000 | 22.000 |
| API Group II | — | 76.119 | — | 76.440 | 76.520 | 76.020 | 76.510 | 76.910 |
| API Group III | — | — | 76.020 | — | — | — | — | — |
| API Group IV | 77.010 | — | — | — | — | — | — | — |
| API Group V | — | — | — | — | 22.000 | — | — | — |
| Additive 1 | 0.550 | 0.550 | 0.550 | 0.550 | 0.550 | 0.550 | 0.550 | 0.050 |
| Additive 2 | 0.040 | 0.040 | 0.040 | 0.040 | 0.040 | 0.040 | 0.040 | — |
| Additive 3 | 0.010 | 0.600 | 1.000 | — | — | — | 0.250 | 0.200 |
| Additive 4 | — | — | — | 0.100 | 0.500 | 1.000 | 0.250 | 0.250 |
| Additive 5 | 0.300 | — | 0.300 | 0.300 | 0.300 | 0.300 | 0.300 | 0.500 |
| Additive 6 | — | 0.600 | — | — | — | — | — | — |
| Additive 7 | 0.050 | 0.050 | 0.050 | 0.050 | 0.050 | 0.050 | 0.050 | 0.050 |
| Additive 8 | 0.020 | 0.020 | 0.020 | 0.500 | 0.020 | 0.020 | 0.020 | 0.020 |
| Additive 9 | 0.020 | 0.020 | 0.020 | 0.020 | 0.020 | 0.020 | 0.020 | 0.020 |
| Additive 10 | — | 0.001 | — | — | — | — | 0.010 | — |
| Total (% wt.) | 100.000 | 100.000 | 100.000 | 100.000 | 100.000 | 100.000 | 100.000 | 100.000 |

TABLE 3

Example 18 to Example 24

| Components | Example 18 | Example 19 | Example 20 | Example 21 | Example 22 | Example 23 | Example 24 |
|---|---|---|---|---|---|---|---|
| API Group I | — | 22.000 | 22.000 | 22.000 | 22.000 | 22.000 | 23.500 |
| API Group II | 75.960 | 74.960 | — | — | 75.960 | 76.160 | 75.600 |
| API Group III | — | — | 76.900 | — | — | — | — |
| API Group IV | — | — | — | 76.110 | — | — | — |
| API Group V | 22.000 | — | — | — | — | — | — |
| Additive 1 | 1.000 | 2.000 | — | — | — | 0.450 | 0.500 |
| Additive 2 | — | — | 0.010 | 0.750 | 1.000 | 0.100 | 0.100 |
| Additive 3 | 0.200 | 0.200 | 0.200 | 0.200 | 0.200 | 0.150 | 0.050 |
| Additive 4 | 0.250 | 0.250 | 0.250 | 0.250 | 0.250 | 0.300 | 0.150 |
| Additive 5 | 0.500 | 0.500 | 0.500 | 0.500 | 0.500 | 0.300 | — |
| Additive 6 | — | — | — | — | — | — | 0.010 |
| Additive 7 | 0.050 | 0.050 | 0.050 | 0.050 | 0.050 | 0.500 | 0.050 |
| Additive 8 | 0.020 | 0.020 | 0.020 | 0.020 | 0.020 | 0.020 | 0.020 |
| Additive 9 | 0.020 | 0.020 | 0.020 | 0.120 | 0.020 | 0.020 | 0.020 |
| Additive 10 | — | — | 0.050 | — | — | — | — |
| Total (% wt.) | 100.000 | 100.000 | 100.000 | 100.000 | 100.000 | 100.000 | 100.000 |

The examples 1 to 24 as illustrated in table 1, table 2 and table 3 were evaluated for various physico-chemical properties (table 4, table 5 & table 6). The candidates (i.e. example 2, example 7, example 9 & example 19) found dull in appearance and further evaluation of these examples were not done (ND).

TABLE 4

Physico-chemical Properties (Examples 1 to 8)

| No. | Properties | Method | Example 1 | Example 2 | Example 3 | Example 4 | Example 5 | Example 6 | Example 7 | Example 8 |
|---|---|---|---|---|---|---|---|---|---|---|
| 1 | Appearance | Visual | Clear | Dull | Clear | Clear | Clear | Clear | Dull | Clear |
| 2 | Kin. Visc@40° C., cSt | D 445 | 97.77 | 96.34 | 97.60 | 96.63 | 95.88 | 96.54 | 94.90 | 96.45 |
| 4 | Kin. Visc@100° C., cSt | D 445 | 11.86 | 11.98 | 12.02 | 11.95 | 11.68 | 11.66 | 11.75 | 11.75 |
| 5 | Viscosity Index | D 2270 | 111 | 114 | 114 | 114 | 111 | 110 | 114 | 111 |
| 6 | Demulsibility @82° C., minutes | D 1401 | 40-38-2 (10) | ND | 40-37-3 (15) | 40-40-0 (10) | 40-37-3 (15) | 40-37-3 (15) | ND | 40-40-0 (10) |
| 7 | Copper Strip corrosion @100° C. for 3 hrs | D 130 | 1b | ND | 1a | 1a | 1a | 1a | ND | 1a |
| 8 | Rust test | D 665 B | Pass | ND | Fail | Pass | Pass | Pass | ND | Pass |
| 9 | RPVOT, minutes | D 2272 | 270 | ND | 480 | 590 | 310 | 380 | ND | 430 |
| 10 | Demulsibility @52° C., | D 2711 (modified) | Pass | ND | Pass | Pass | Pass | Pass | ND | Fail |

TABLE 5

Physico-chemical Properties (Examples 9 to 16)

| No. | Properties | Method | Example 9 | Example 10 | Example 11 | Example 12 | Example 13 | Example 14 | Example 15 | Example 16 |
|---|---|---|---|---|---|---|---|---|---|---|
| 1 | Appearance | Visual | Dull | Clear | Clear | Clear | Clear | Clear | Clear | Clear |
| 2 | Kin. Visc@40° C., cSt | D 445 | 97.41 | 97.62 | 97.45 | 97.42 | 97.54 | 97.63 | 97.68 | 97.62 |
| 4 | Kin. Visc@100° C., cSt | D 445 | 11.79 | 11.84 | 11.79 | 11.80 | 11.87 | 11.76 | 11.77 | 11.75 |
| 5 | Viscosity Index | D 2270 | 110 | 111 | 110 | 111 | 112 | 110 | 110 | 110 |
| 6 | Demulsibility @82° C., minutes | D 1401 | ND | 40-38-2 (10) | 40-37-3 (10) | 40-37-3 (15) | 40-40-0 (10) | 40-37-3 (15) | 40-37-3 (15) | 40-37-3 (10) |
| 7 | Copper Strip corrosion @100° C. for 3 hrs | D 130 | ND | 1a | 1a | 1a | 1a | 1a | 1a | 1a |
| 8 | Rust test | D 665 B | ND | Pass | Pass | Pass | Pass | Pass | Pass | Pass |
| 9 | RPVOT, minutes | D 2272 | ND | 100 | 440 | 680 | 150 | 425 | 610 | 630 |
| 10 | Demulsibility @52° C., | D 2711 (modified) | ND | Pass | Pass | Pass | Pass | Pass | Pass | Pass |

TABLE 6

Physico-chemical Properties (Examples 17 to 24)

| No. | Properties | Method | Example 17 | Example 18 | Example 19 | Example 20 | Example 21 | Example 22 | Example 23 | Example 24 |
|---|---|---|---|---|---|---|---|---|---|---|
| 1 | Appearance | Visual | Clear | Clear | Dull | Clear | Clear | Clear | Clear | Clear |
| 2 | Kin. Visc@40° C., cSt | D 445 | 97.42 | 97.40 | 97.35 | 96.84 | 96.44 | 96.21 | 97.62 | 97.80 |
| 4 | Kin. Visc@100° C., cSt | D 445 | 11.75 | 11.72 | 11.76 | 11.82 | 11.75 | 11.70 | 11.75 | 11.80 |
| 5 | Viscosity Index | D 2270 | 110 | 109 | 110 | 112 | 111 | 111 | 110 | 110 |

TABLE 6-continued

Physico-chemical Properties (Examples 17 to 24)

| No. | Properties | Method | Example 17 | Example 18 | Example 19 | Example 20 | Example 21 | Example 22 | Example 23 | Example 24 |
|---|---|---|---|---|---|---|---|---|---|---|
| 6 | Demulsibility @82° C., minutes | D 1401 | 40-38-2 (10) | 40-37-3 (20) | ND | 40-40-0 (10) | 40-37-3 (25) | 40-37-3 (20) | 40-37-3 (15) | 40-37-3 (15) |
| 7 | Copper Strip corrosion @100° C. for 3 hrs | D 130 | 1a | 1a | ND | 1a | 1a | 1a | 1a | 1a |
| 8 | Rust test | D 665 B | Pass | Pass | ND | Pass | Pass | Pass | Pass | Fail |
| 9 | RPVOT, minutes | D 2272 | 540 | 510 | ND | 520 | 480 | 490 | 520 | 320 |
| 10 | Demulsibility @ 52° C. | D 2711 (modified) | Pass | Pass | ND | Pass | Pass | Pass | Pass | Pass |

TABLE 7

Tribological Properties (Examples 1 to 8)

| No. | Properties | Method | Example 1 | Example 3 | Example 4 | Example 5 | Example 6 | Example 8 |
|---|---|---|---|---|---|---|---|---|
| 1 | Four Ball Wear Test @ 20 Kg, 1800 rpm, 54° C. for 1 hour, mm | ASTM D 4172 | 0.65 | 0.50 | 0.35 | 0.45 | 0.50 | 0.40 |
| 2 | Weld Load, Kgs. | IP 239 | 112 | 140 | 160 | 140 | 150 | 160 |
| 3 | FZG, Gear Test, failure load stage, | DIN51354 (A/8.3/90) | 8 | ND | >12 | 12 | 10 | ND |

TABLE 8

Tribological Properties (Examples 9 to 16)

| No. | Properties | Method | Example 10 | Example 11 | Example 12 | Example 13 | Example 14 | Example 15 | Example 16 |
|---|---|---|---|---|---|---|---|---|---|
| 1 | Four Ball Wear Test @ 20 Kg, 1800 rpm, 54° C. for 1 hour, mm | ASTM D 4172 | 0.40 | 0.40 | 0.40 | 0.40 | 0.40 | 0.40 | 0.40 |
| 2 | Weld Load, Kgs. | IP 239 | 160 | 160 | 160 | 160 | 160 | 160 | 160 |
| 3 | FZG, Gear Test, failure load stage | DIN 51354 (A/8.3/90) | 8 | 10 | 11 | 9 | 10 | 11 | 12 |

TABLE 9

Tribological Properties (Examples 17 to 24)

| No. | Properties | Method | Example 17 | Example 18 | Example 20 | Example 21 | Example 22 | Example 23 | Example 24 |
|---|---|---|---|---|---|---|---|---|---|
| 1 | Four Ball Wear Test @ 20 Kg, 1800 rpm, 54° C. for 1 hour, mm | ASTM D 4172 | 0.65 | 0.40 | 0.70 | 0.40 | 0.55 | 0.35 | 0.45 |
| 2 | Weld Load, Kgs. | IP 239 | 112 | 160 | 140 | 140 | 140 | 160 | 160 |

TABLE 9-continued

Tribological Properties (Examples 17 to 24)

| No. | Properties | Method | Example 17 | Example 18 | Example 20 | Example 21 | Example 22 | Example 23 | Example 24 |
|---|---|---|---|---|---|---|---|---|---|
| 3 | FZG, Gear Test, failure load stage, | DIN 51354 (A/8.3/90) | 6 | 8 | 6 | 9 | 7 | >12 | ND |

The tribological evaluation of the compositions were performed for screening of the samples for weld load as per IP 239 and wear scar diameter by ASTM D 4172 test methods. The heavy duty bearing oil composition was found to have poor, moderate and excellent property in terms of weld load, wear scar diameter as per the standard test methods. In order to assess the load bearing capability, FZG A/8.3/90 test was conducted as per DIN 51354 standard method (table 7, table 8 & table 9).

TABLE 10

Demulsibility tests (as per ASTM D 2711 (modified))

| Property | Method | Example 4 | Example 16 | Example 23 | MNC product | Remarks |
|---|---|---|---|---|---|---|
| Demulsibility test@52° C. Free water, ml % water in oil Emulsion, ml | D 2711 modified - non EP method | 34.0 0.4 Nil | 35.0 0.2 Nil | 35.0 0.4 Nil | 34.0 0.4 Nil | Better demulsification 30.0 Report 1.0 Maximum |

TABLE 11

UEC Dynamic Demulsibility Endurance test (DDE)

| Property | Method | Example 4 | Example 16 | Example 23 | Remarks |
|---|---|---|---|---|---|
| UEC Dynamic demulsibility Endurance Test @52° C. (*) | UEC Dynamic demulsibility Endurance Test | | | | (As per OEM lubricant standard) 10 Maximum |
| % water in oil after centrifuging | | 2.0 | 4.0 | 2.0 | 1 Maximum |
| % oil in water after centrifuging | | Nil | Nil | Nil | |

(*) Dynamic Demulsibility test conducted at Clark Lab, USA

TABLE 12

Gradual increase in step load in SRV rig:

| Properties | Method | Example 4 | Example 16 | Example 23 | MNC product | Remarks |
|---|---|---|---|---|---|---|
| SRV failure load, N | SRV | >1500 | >1300 | >1500 | 800 | Significantly higher load carrying ability |

Example 4, 16 and 23 found to be promising meeting physico-chemical with superior tribological properties in comparison to industry accepted product.

The coefficient of friction & traction coefficient properties on the composition were studied in SRV and MTM machines.

TABLE 13

Traction coefficient in Mini Traction Machine (MTM):
Details of candidate 4, 16 & 23

Example 4

| Speed (mm/sec) | Load (N) | Temperature (° C.) | SRR (%) | Remarks (Example 4 in comparison to MNC product) |
|---|---|---|---|---|
| 3000 | 10 | 80 | 0 | ~40% less traction coefficient in pure rolling |
| 3000 | 50 | 80 | 40 | ~6 to 7% lower traction coefficient in 40% SRR |
| 3000 | 70 | 50 | 40 | ~4 to 5% lower traction coefficient in 40% SRR |
| 3000 | 70 | 80 | 40 | ~6% lower traction coefficient in 40% SRR |

Example 16

| Speed (mm/sec) | Load (N) | Temperature (° C.) | SRR (%) | Remarks (Example 16 in comparison to MNC product) |
|---|---|---|---|---|
| 100 | 30 | 40 | 50 | ~3.4% lower traction coefficient in 50% SRR |
| 4000 | 30 | 40 | 50 | Comparable with MNC product in 50% SRR |
| 100 | 30 | 60 | 50 | ~9% lower traction coefficient in 50% SRR |
| 4000 | 30 | 60 | 50 | ~2.8% lower traction coefficient in 50% SRR |

Example 23

| Speed (mm/sec) | Load (N) | Temperature (° C.) | SRR (%) | Remarks (Example 23 in comparison to MNC product) |
|---|---|---|---|---|
| 1000 | 30 | 50 | 0 | Comparable with MNC product in pure rolling |
| 10 | 30 | 50 | 20 | ~52% lower traction coefficient in 20% SRR |
| 100 | 30 | 50 | 20 | ~40% lower traction coefficient in 20% SRR |
| 1000 | 30 | 50 | 20 | ~18.2% lower traction coefficient in 50% SRR |

SRR = sliding rolling ratio

The zinc free novel bearing oil composition meet the physico-chemical properties and possess excellent demulsibility characteristics in static and dynamic demulsibility tests and retention in demulsibility property during extended operation in the field.

The novel composition provided superior load bearing capability in gradual increase in step load in SRV test rig (table 12) and better traction coefficient in MTM in pure rolling and at different sliding rolling ratios at different various load and temperatures when compared to the industry accepted product (table 13).

The field validation on novel composition was done in an integrated steel plant in India wherein composition provided superior performance in mill parameters.

The invention claimed is:

1. A zinc free bearing oil composition consisting of:
   (a) 0.45-0.55 weight % of di-n-octyl-phosphite, tris-nonylphenyl phosphate or i-decyl-diphenyl phosphate as an ashless antiwear or an extreme pressure agent;
   (b) 0.4 to 1.0 weight % of dialkyl dithiophosphate as an antiwear, extreme pressure or FZG booster;
   (c) 0.15 weight % of 3-5-bis(1-1-dimethylethyl)-4-hydroxy alkyl ester or a $C_7$-$C_9$ alkyl ester as a phenolic oxidation inhibitor;
   (d) 0.3 weight % of butylated diphenylamine as an aminic oxidation inhibitor;
   (e) 0.3 weight % of calcium sulphonates as a rust or a corrosion inhibitor I having a sulphonate, wherein the calcium sulphonate has a total base number is a range of 180 to 450;
   (f) 0.05 to 0.50 weight % of triazole derivative as a metal passivator;
   (g) 0.02 weight % of poly methacrylates as a pour point depressant;
   (h) 0.02 weight % of polyacrylate as a defoament as; and
   (i) 90 to 99.9 weight % of a base,
   wherein the weight % being based on the total weight of the composition and
   wherein the composition is zinc free and demulsifier free.

2. The composition as claimed in claim 1, wherein the base oil is selected from the base oil of API Group I, API Group II, API Group III, API Group IV and API Group V and mixture thereof.

3. A process for preparing zinc free bearing oil composition, wherein the process comprises mixing the additives in the amount as mentioned in claim 1 in the base oil at a temperature in the range of 60° C. to 65° C.

* * * * *